(12) United States Patent
Kolhatkar et al.

(10) Patent No.: US 9,685,820 B2
(45) Date of Patent: Jun. 20, 2017

(54) REDUNDANT UNINTERRUPTIBLE POWER SUPPLY SYSTEMS

(71) Applicant: General Electric Company, Schenectady, NY (US)

(72) Inventors: Yashomani Kolhatkar, Bangalore (IN); Pradeep Vijayan, Bangalore (IN); Viswanathan Kanakasabai, Bangalore (IN); Silvio Colombi, Losone (CH); Rajendra Naik, Bangalore (IN); Prashanth Manikumar Chennamsetty, Bangalore (IN)

(73) Assignee: General Electric Company, Schenectady, NY (US)

( * ) Notice: Subject to any disclaimer, the term of this patent is extended or adjusted under 35 U.S.C. 154(b) by 528 days.

(21) Appl. No.: 14/306,641

(22) Filed: Jun. 17, 2014

(65) Prior Publication Data

US 2015/0263566 A1 Sep. 17, 2015

Related U.S. Application Data

(60) Provisional application No. 61/951,281, filed on Mar. 11, 2014.

(51) Int. Cl.
*H02J 9/06* (2006.01)
*H02J 3/40* (2006.01)
(Continued)

(52) U.S. Cl.
CPC .............. *H02J 9/061* (2013.01); *G05F 3/02* (2013.01); *H02J 3/40* (2013.01); *H02J 3/46* (2013.01);
(Continued)

(58) Field of Classification Search
CPC .... H02J 9/06; H02J 9/061; H02J 9/062; H02J 3/46; H02J 3/40; H02J 3/42; Y10T 307/62; Y10T 307/615; Y10T 307/344
See application file for complete search history.

(56) References Cited

U.S. PATENT DOCUMENTS 5,473,528 A 12/1995 Hirata et al.
5,745,356 A 4/1998 Tassitino, Jr. et al.
(Continued)

FOREIGN PATENT DOCUMENTS

CN 202333831 U 7/2012
CN 202444318 U 9/2012
(Continued)

OTHER PUBLICATIONS

Shanxu, Duan, et al. "Parallel operation control technique of voltage source inverters in UPS." Power Electronics and Drive Systems, 1999. PEDS'99. Proceedings of the IEEE 1999 International Conference on. vol. 2. IEEE, 1999.*
(Continued)

*Primary Examiner* — Ryan Johnson
(74) *Attorney, Agent, or Firm* — General Electric Company

(57) ABSTRACT

A system is provided. The system includes a utility, a plurality of uninterruptible power supplies (UPSs), a ring bus, at least one load electrically coupled to the plurality of UPSs and the ring bus, and a controller communicatively coupled to the plurality of UPSs, the controller configured to determine a common reference angle while the utility is disconnected from at least one UPS of the plurality of UPSs, calculate a phase angle for each UPS of the plurality of UPSs, wherein the phase angle for each UPS is calculated
(Continued)

relative to the common reference angle, and control operation of each UPS based on the respective calculated phase angles.

20 Claims, 11 Drawing Sheets

(51) Int. Cl.
*H02J 3/46* (2006.01)
*G05F 3/02* (2006.01)
*H02J 4/00* (2006.01)

(52) U.S. Cl.
CPC .............. *H02J 4/00* (2013.01); *H02J 9/062* (2013.01); *Y10T 307/344* (2015.04)

(56) References Cited

U.S. PATENT DOCUMENTS

| | | | |
|---|---|---|---|
| 6,121,695 | A | 9/2000 | Loh |
| 6,191,500 | B1 | 2/2001 | Toy |
| 6,803,679 | B1 | 10/2004 | Luo et al. |
| 7,400,066 | B2 | 7/2008 | Tassitino, Jr. et al. |
| 7,405,494 | B2 * | 7/2008 | Tassitino, Jr. ........... H02J 9/062 307/45 |
| 7,425,779 | B2 | 9/2008 | Luo et al. |
| 7,446,433 | B2 | 11/2008 | Masciarelli et al. |
| 7,456,520 | B2 | 11/2008 | Colombi et al. |
| 7,459,803 | B2 | 12/2008 | Mosman |
| 7,566,988 | B2 | 7/2009 | Heber et al. |
| 7,615,890 | B2 | 11/2009 | Masciarelli et al. |
| 7,638,899 | B2 | 12/2009 | Tracy et al. |
| 7,649,758 | B2 | 1/2010 | Taimela et al. |
| 7,667,351 | B2 | 2/2010 | Marwali et al. |
| 7,701,087 | B2 | 4/2010 | Eckroad et al. |
| 7,825,541 | B2 | 11/2010 | Herbener et al. |
| 7,980,905 | B2 | 7/2011 | Rembach et al. |
| 8,022,572 | B2 | 9/2011 | Vyas et al. |
| 8,035,250 | B2 | 10/2011 | Caudill |
| 8,062,081 | B2 | 11/2011 | Barrett et al. |
| 8,148,846 | B2 | 4/2012 | Masciarelli et al. |
| 8,552,589 | B2 | 10/2013 | Ghosh et al. |
| 8,604,640 | B2 | 12/2013 | Masciarelli et al. |
| 8,786,262 | B2 | 7/2014 | Rajashekara et al. |
| 2004/0084965 | A1 | 5/2004 | Welches et al. |
| 2005/0052085 | A1 | 3/2005 | Chang et al. |
| 2006/0006741 | A1 | 1/2006 | Tassitino, Jr. et al. |
| 2006/0113800 | A1 | 6/2006 | Willisch et al. |
| 2006/0167569 | A1 | 7/2006 | Colombi et al. |
| 2007/0007825 | A1 | 1/2007 | Heber et al. |
| 2007/0063677 | A1 | 3/2007 | Schauder |
| 2009/0009001 | A1 | 1/2009 | Marwali et al. |
| 2009/0009005 | A1 | 1/2009 | Luo et al. |
| 2009/0273192 | A1 | 11/2009 | Guven et al. |
| 2010/0002475 | A1 | 1/2010 | Folts et al. |
| 2010/0096853 | A1 | 4/2010 | Woldmann et al. |
| 2011/0106325 | A1 | 5/2011 | Opina, Jr. et al. |
| 2011/0278932 | A1 | 11/2011 | Navarro et al. |
| 2011/0278934 | A1 | 11/2011 | Ghosh et al. |
| 2011/0309677 | A1 | 12/2011 | Bourgeau |
| 2012/0068541 | A1 | 3/2012 | Anderson |
| 2013/0002014 | A1 | 1/2013 | Moore et al. |
| 2013/0069432 | A1 | 3/2013 | Beg et al. |
| 2013/0069434 | A1 | 3/2013 | Beg et al. |
| 2013/0193760 | A1 | 8/2013 | Colombi et al. |
| 2014/0139016 | A1 | 5/2014 | Lovercheck et al. |

FOREIGN PATENT DOCUMENTS

| | | |
|---|---|---|
| CN | 202889279 U | 4/2013 |
| CN | 103560576 A | 2/2014 |
| DE | 102008024222 A1 | 2/2009 |
| DE | 10 2009 017 244 A1 | 10/2010 |
| EP | 1 006 641 A2 | 6/2000 |
| EP | 1 919 055 A2 | 5/2008 |
| EP | 2 101 392 A2 | 9/2009 |
| EP | 2 587 609 A1 | 5/2013 |
| EP | 2608355 A2 | 6/2013 |
| EP | 2911035 A1 | 8/2015 |
| JP | 2005033890 A | 2/2005 |
| KR | 101267513 B1 | 5/2013 |
| WO | 2004/025823 A1 | 3/2004 |
| WO | 2013/123546 A1 | 8/2013 |
| WO | 2013142561 A1 | 9/2013 |

OTHER PUBLICATIONS

Holtz, Joachim, and K-H. Werner. "Multi-inverter UPS system with redundant load sharing control." IEEE Transactions on Industrial Electronics 37.6 (1990): 506-513.*
TMS320F240 DSP Controller (Rev. E) Datasheet, Nov. 2002, Retrieved from http://www.ti.com/product/TMS320F240.*
Noworolski, "Parallel UPS Control and Configuration", Third International Telecommunications Energy Conference, pp. 205-209, May 19-21, 1981.
Xing et al., "Novel control for redundant parallel UPSs with instantaneous current sharing", Proceedings of the Power Conversion Conference, vol. 3, pp. 959-963, 2002.
Guerrero et al., "A high-performance DSP-controller for parallel operation of online UPS systems", Nineteenth Annual IEEE Applied Power Electronics Conference and Exposition, vol. 1, pp. 463-469, 2004.
Sato et al., "High Reliability and High Performance Parallel-Connected UPS System with Independent Control", Twenty-Seventh International Telecommunications Conference, pp. 389-394, Sep. 2005.
European Search Report and Written Opinion issued in connection with EP Application No. 15155175.1 dated Jun. 23, 2015.
Mosman, "An Isolated-Parallel UPS System for a Large Data Center"The Magazine of 7×24 Exchange International, Data Center Cooling Energy Basics, 2007, pp. 68.
Johnson et al., "An Industrial Power Distribution System Featuring UPS Properties", Power Electronics Specialists Conference, 1993. PESC '93 Record., 24th Annual IEEE, Jun. 1993, pp. 759-765.
Zhongyi et al., "Distributed Control for UPS Modules in Parallel Operation With RMS Voltage Regulation", Industrial Electronics, IEEE Transactions on , Aug. 2008, pp. 2860-2869, vol. 55 , Issue: 8 ).
U.S. Appl. No. 14/186,149, filed Feb. 21, 2014, Yashomani Kolhatkar et al.
U.S. Appl. No. 14/306,791, filed Jun. 17, 2014, Yashomani Kolhatkar et al.
Byun et al., "Parallel Operation of Three-Phase UPS Inverters by Wireless Load Sharing Control", Telecommunications Energy Conference, Piscataway, NJ, USA, pp. 526-532, Sep. 10, 2000.
Yao et al., "Development of Communicationless Hot-Swap Paralleling for Single-Phase UPS Inverters Based on Adaptive Droop Method", Applied Power Electronics Conference and Exposition, Piscataway, NJ, USA, pp. 1283-1287, Feb. 15, 2009.
European Search Report and Opinion issued in connection with related EP Application No. 15157301.1 on Aug. 14, 2015.
European Search Report and Opinion issued in connection with corresponding EP Application No. 15157305.2 on Sep. 28, 2015.
Iwanski G. and Koczara W., "DFIG-Based Power Generation System With UPS Function for Variable-Speed Applications," IEEE Transactions on Industrial Electronics, vol. 55, Issue 8, Aug. 8, 2008, pp. 3047-3054.
Liu X. et al., "A Hybrid AC/DC Microgrid and Its Coordination Control," IEEE Transactions on Smart Grid, vol. 2, Issue 2, Jun. 2011, pp. 278-286.
Waris T. and Nayar C.V., "Variable speed constant frequency diesel power conversion system using doubly fed induction generator (DFIG)," Power Electronics Specialists Conference, 2008, PESC'2008, IEEE, Jun. 15-19, 2008, pp. 2728-2734.

(56) References Cited

OTHER PUBLICATIONS

Zhou Y., et al., "Grid-connected and islanded operation of a hybrid power system," Power Engineering Society Conference and Exposition in Africa, 2007, PowerAfrica '07, IEEE, Jul. 16-20, 2007, pp. 1-6.
Extended European Search Report and Opinion issued in connection with related EP Application No. 16170543.9 on Oct. 24, 2016.
Extended European Search Report and Opinion issued in connection with related EP Application No. 16172123.8 on Nov. 4, 2016.
U.S. Appl. No. 14/186,159, filed Feb. 21, 2014, Kolhatkar et al.
U.S. Appl. No. 14/306,791, filed Jun. 17, 2014, Kolhatkar et al.
U.S. Appl. No. 14/725,949, filed May 29, 2015, Tiwari et al.
U.S. Appl. No. 14/732,215, filed Jun. 5, 2015, Tiwari et al.
Chandorkar et al. "Control of parallel connected inverters in stand-alone AC supply systems." IEEE Transactions on Industry Applications 29.1 (1993): 136-143.
Guerrero, Josep M., et al. "Control of line-interactive UPS connected in parallel forming a microgrid." 2007 IEEE International Symposium on Industrial Electronics. IEEE, 2007.
TMS320C6711b datasheet. 2005. Retrieved from http://www.ti.com/lit/ds/symlink/tms320c6711b.pdf.
TMS320LC2402a datasheet. 2005. Retrieved from http://www.ti.com/lit/ds/symlink/tms320lc2402a.pdf.

* cited by examiner ently supplied to one or more critical loads, even when one or more components of a power system fail. Accordingly, UPSs provide a redundant power source. UPSs may be utilized in a number of applications (e.g., utility substations, industrial plants, marine systems, high security systems, hospitals, datacomm and telecomm centers, semiconductor manufacturing sites, nuclear power plants, etc.). Further, UPSs may be utilized in high, medium, or low power applications. For example, UPSs may be used in relatively small power systems (e.g., entertainment or consumer systems) or microsystems (e.g., a chip-based system).

REDUNDANT UNINTERRUPTIBLE POWER SUPPLY SYSTEMS

CROSS REFERENCE TO RELATED APPLICATIONS

This application is a non-provisional application and claims priority to U.S. Provisional Patent Application Ser. No. 61/951,281 filed Mar. 11, 2014 for "REDUNDANT UNINTERRUPTIBLE POWER SUPPLY SYSTEMS", which is hereby incorporated by reference in its entirety.

BACKGROUND

The field of the invention relates generally to uninterruptible power supplies, and more particularly, to implementing uninterruptible power supplies in a ring bus architecture.

Robust power systems enable supplying power to one or more loads. Such power systems may include combinations of generation, transport, rectification, inversion and conversion of power to supply energy for electronic, optical, mechanical, and/or nuclear applications and loads. When implementing power systems and architectures, practical considerations include cost, size, reliability, and ease of implementation.

In at least some known power systems, one or more uninterruptible power supplies (UPSs) facilitate supplying power to a load. UPSs facilitate ensuring that power is continuously supplied to one or more critical loads, even when one or more components of a power system fail. Accordingly, UPSs provide a redundant power source. UPSs may be utilized in a number of applications (e.g., utility substations, industrial plants, marine systems, high security systems, hospitals, datacomm and telecomm centers, semiconductor manufacturing sites, nuclear power plants, etc.). Further, UPSs may be utilized in high, medium, or low power applications. For example, UPSs may be used in relatively small power systems (e.g., entertainment or consumer systems) or microsystems (e.g., a chip-based system).

In at least some known power systems, different power sources, such as separate UPSs, may interfere with one another. If the power sources are not synchronized with one another, they may begin to override one another, causing oscillations or other undesirable effects, and impacting power delivered to one or more loads. Further, if separate UPSs are all operating relative to a common reference angle, and a utility becomes disconnected from at least one of the separate UPSs, the common reference angle for one UPS may drift and become different from the common reference angle for another UPS, which may impact load sharing and stability of the power system.

BRIEF DESCRIPTION

In one aspect, a system is provided. The system includes a utility, a plurality of uninterruptible power supplies (UPSs), a ring bus, at least one load electrically coupled to the plurality of UPSs and the ring bus, and a controller communicatively coupled to the plurality of UPSs, the controller configured to determine a common reference angle while the utility is disconnected from at least one UPS of the plurality of UPSs, calculate a phase angle for each UPS of the plurality of UPSs, wherein the phase angle for each UPS is calculated relative to the common reference angle, and control operation of each UPS based on the respective calculated phase angles.

In another aspect, a controller for controlling a power supply system that includes a utility, a plurality of uninterruptible power supplies (UPSs), a ring bus, and at least one load electrically coupled to the plurality of UPSs and the ring bus is provided. The controller includes a processor, and a memory device communicatively coupled to the processor, the memory device storing executable instructions configured to cause the processor to determine a common reference angle while the utility is disconnected from at least one UPS of the plurality of UPSs, calculate a phase angle for each UPS of the plurality of UPSs, wherein the phase angle for each UPS is calculated relative to the common reference angle, and control operation of each UPS based on the respective calculated phase angles.

In yet another aspect, a method of controlling a power supply system is provided. The power supply system includes a utility, a plurality of uninterruptible power supplies (UPSs), a ring bus, and at least one load electrically coupled to the plurality of UPSs and the ring bus. The method includes determining a common reference angle while the utility is disconnected from at least one UPS of the plurality of UPSs, calculating, using a controller communicatively coupled to the plurality of UPSs, a phase angle for each UPS of the plurality of UPSs, wherein the phase angle for each UPS is calculated relative to the common reference angle, and controlling operation of each UPS based on the respective calculated phase angles.

DETAILED DESCRIPTION

Exemplary embodiments of an uninterruptible power supply system are described here. A utility is electrically coupled to a plurality of uninterruptible power supplies. The plurality of uninterruptible power supplies are arranged in a ring bus configuration and configured to supply power to at least one load. A control device is communicatively coupled to the plurality of uninterruptible power supplies. The control device is configured to determine a common reference angle in the event that the utility becomes disconnected from at least one of the plurality of uninterruptible power supplies.

Figure 1:
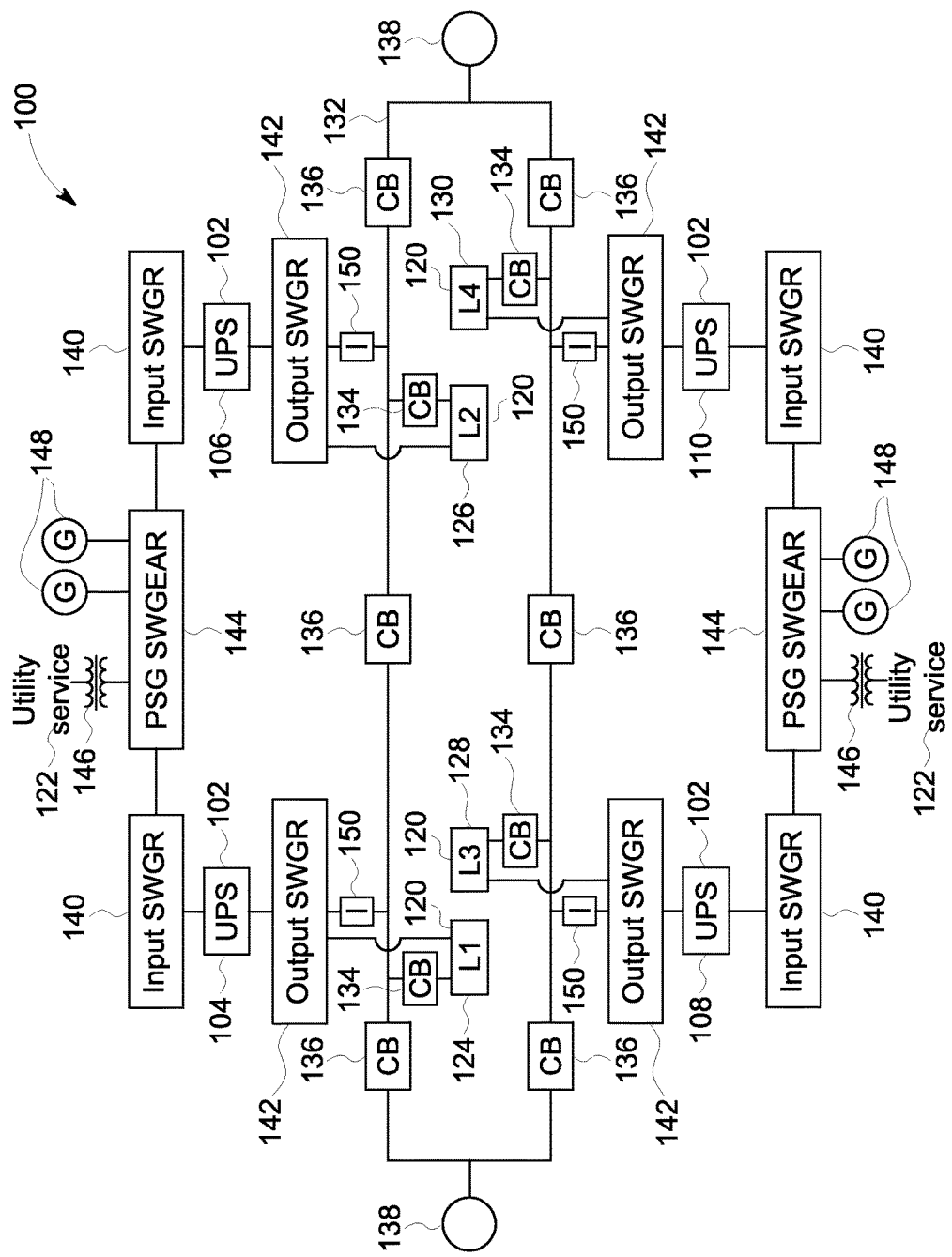
FIG. 1 is a schematic diagram of an exemplary power supply system.

FIG. 1 is a schematic diagram of an exemplary redundant isolated-parallel (IP) uninterruptible power supply (UPS) system 100. In the exemplary embodiment, system 100 includes a plurality of UPSs 102 arranged in a ring architecture, or parallel architecture, as described herein. Specifically, system 100 includes a first UPS 104, a second UPS 106, a third UPS 108, and a fourth UPS 110 in the exemplary embodiment. Alternatively, system 100 may include any number of UPSs 102 that enable system 100 to function as described herein. In the exemplary embodiment, system 100 is a three wire system. Alternatively, system 100 may be a four wire system (i.e., a system including a neutral wire to each load).

In the exemplary embodiment, UPSs 102 are static double conversion UPSs (i.e., true on-line system systems). Both static and rotary UPSs may require droop control techniques for both voltage and frequency. In some cases, droop control for frequency alone may be sufficient. In some embodiments, droop control techniques are adapted depending on whether a load is linear or non-linear.

System 100 facilitates providing power to one or more loads 120. Under normal operation, one or more utilities 122 function as a power source and provide power to loads 120. Utilities 122 may provide alternating current (AC) or direct current (DC) power to system 100. In the event that power from utilities 122 fails to reach loads 120 (e.g., due to a failure of utility 122 and/or devices between utility 122 and loads 120), system 100 utilizes UPSs 102 to keep power flowing to loads 120, as described herein. In the exemplary embodiment, system 100 includes a first load 124, a second load 126, a third load 128, and a fourth load 130. Alternatively, system 100 may include any number of loads 120 that enable system 100 to function as described herein.

Each load 120 is electrically coupled between an associated UPS 102 and a ring bus 132. Specifically, in the exemplary embodiment, each load 120 is coupled to ring bus 132 via an associated load circuit breaker 134. Further, ring bus 132 includes a plurality of ring bus circuit breakers 136. In the event that any segment of ring bus 132 fails or is shut down, the architecture of system 100 ensures that power is still able to reach loads 120. Notably, the architecture shown in FIG. 1 is merely exemplary. For example, in some embodiments, loads 120 may be coupled directly to ring bus 132 or may be coupled between UPSs 102. Further, system 100 may include additional UPSs 138 coupled directly to ring bus 132.

In the exemplary embodiment, each UPS 102 is electrically coupled between an input switchgear 140 and an output switchgear 142. Input switchgears 140 are electrically coupled to paralleling switchgears 144, which are in turn electrically coupled to utility 122 through an associated transformer 146. In the exemplary embodiment, each paralleling switchgear 144 is also electrically coupled to one or more grounds 148. Switchgears 140, 142, and 144 include may include local circuits, remote synchronization circuits, and/or software to facilitate attenuating disturbances, interference, and/or crosstalk on ring bus 132 to provide clean power to loads 120. In the exemplary embodiment, each output switchgear 142 is electrically coupled directly to an associated load 120, and coupled to ring bus 132 through an associated choke 150 (e.g., an inductor).

In system 100, without proper synchronization, UPSs 102 may interfere with one another and/or start to override one another, causing oscillations or other undesirable effects. Accordingly, in the exemplary embodiment, a controller (not shown in FIG. 1) controls operation UPSs 102. More specifically, the controller controls a phase angle, $\delta$, of an output voltage of each UPS 102, as described herein. The phase angle $\delta$ is calculated relative to a common reference angle, $\theta$. This common reference may be taken from different sources. For example, the common reference may be a common utility input voltage from utility 122 or a common IP bus voltage from ring bus 132.

Figure 2:
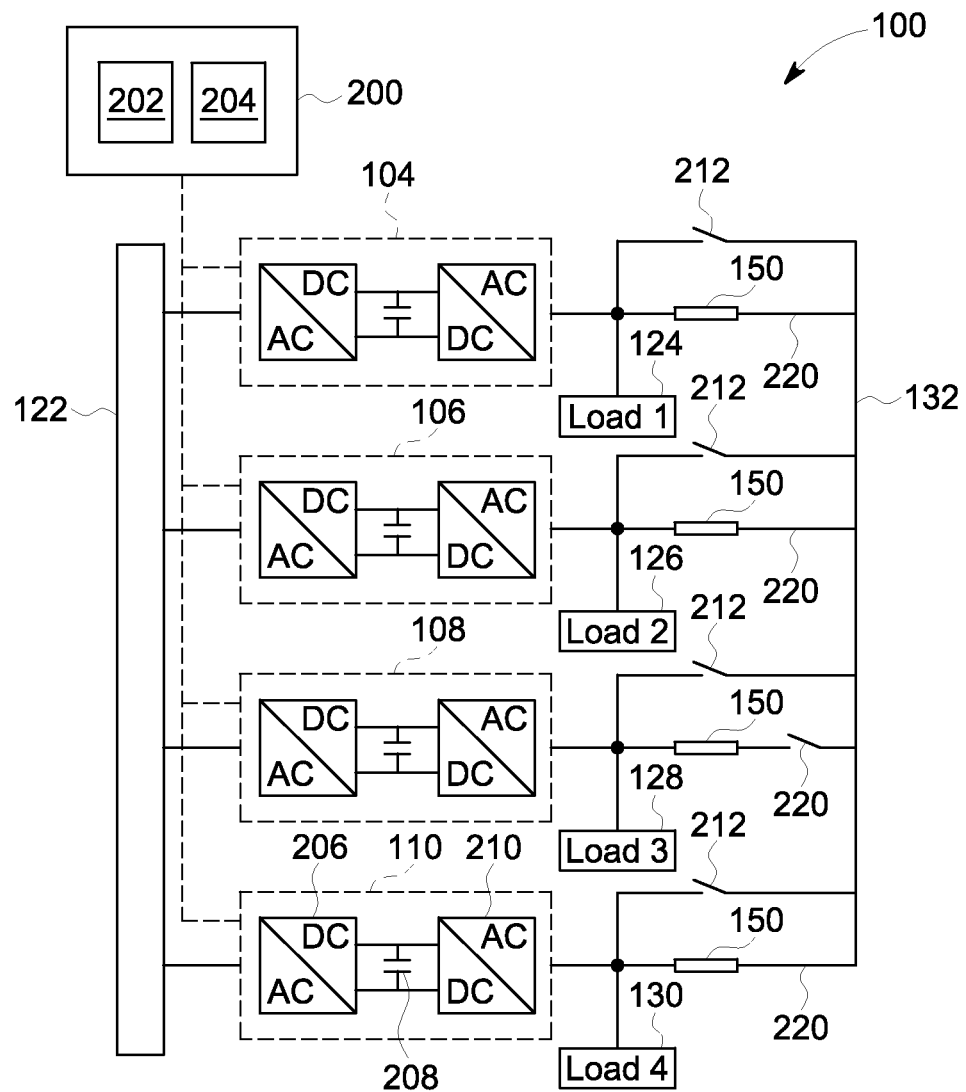
FIG. 2 is a simplified diagram of the system shown in FIG. 1.

FIG. 2 is a simplified diagram of system 100. As shown in FIG. 2, a controller 200 is communicatively coupled to each of first UPS 104, second UPS 106, third UPS 108, and fourth UPS 110. Although a single controller 200 is shown in FIG. 2, alternatively, a separate controller may control the operation of each UPS 102. Controller 200 may include its own power system (not shown) such as a dedicated energy source (e.g., a battery). In some embodiments, controller 200 is coupled to a substitute controller (not shown) that may be used in the event that controller 200 fails. Controller 200 may control power distribution and management of system 100 over a relatively large geographic area.

In the exemplary embodiment, controller 200 is implemented by a processor 202 communicatively coupled to a memory device 204 for executing instructions. In some embodiments, executable instructions are stored in memory device 204. Alternatively, controller 200 may be implemented using any circuitry that enables controller 200 to control operation of UPSs 102 as described herein. For example, in some embodiments, controller 200 may include a state machine that learns or is pre-programmed to determine information relevant to which loads 120 require power. For example, controller 200 may dynamically determine what power resources will be needed and at what performance level and environmental conditions (e.g., temperature, humidity, time of day, etc.) those power resources will need to operate. Controller 200 may perform dynamic monitoring to determine whether a given load 120 is satisfied with the power delivered, and whether delivered power is free of harmonics, transients, etc. In some embodiments, dynamic monitoring may include tracking resource usage to determine how much current or voltage should be delivered. Controller 200 may also monitor and/or control rapidity (i.e., bandwidth) and inverter capability (e.g., overload, reactive power, active power) to facilitate ensuring reliability of system 100 and minimizing performance degradation of UPSs 102.

Controller 200 may also include a state machine scheduler configured to selectively activate and deactivate power resources, set voltage and current levels, and/or take power saving actions (e.g., reducing current delivery). Controller 200 may also track characteristics (e.g., static allocation of power) of system 100 to determine whether one or more components of system 100 should be put on standby or whether power should be diverted.

In the exemplary embodiment, controller 200 performs one or more operations described herein by programming processor 202. For example, processor 202 may be programmed by encoding an operation as one or more executable instructions and by providing the executable instructions in memory device 204. Processor 202 may include one or more processing units (e.g., in a multi-core configuration) . Further, processor 202 may be implemented using one or more heterogeneous processor systems in which a main processor is present with secondary processors on a single chip. As another illustrative example, processor 202 may be a symmetric multi-processor system containing multiple processors of the same type. Further, processor 202 may be implemented using any suitable programmable circuit including one or more systems and microcontrollers, microprocessors, reduced instruction set circuits (RISC), application specific integrated circuits (ASIC), programmable logic circuits, field programmable gate arrays (FPGA), and any other circuit capable of executing the functions described herein. In the exemplary embodiment, processor 202 causes controller 200 to operate UPSs 102, as described herein.

In the exemplary embodiment, memory device 204 is one or more devices that enable information such as executable instructions and/or other data to be stored and retrieved. Memory device 204 may include one or more computer readable media, such as, without limitation, dynamic random access memory (DRAM), static random access memory (SRAM), a solid state disk, and/or a hard disk. Memory device 204 may be configured to store, without limitation, application source code, application object code, source code portions of interest, object code portions of interest, configuration data, execution events and/or any other type of data.

As shown in FIG. 2, UPSs 102 and loads 120 are electrically coupled to one another through chokes 150 and ring bus 132. Each UPS 102 includes a rectifier 206, an inverter 208, and a DC capacitor 210 in the exemplary embodiment. Further, each load 120 is electrically coupled in parallel with an output capacitor (not shown), and each UPS 102 is electrically coupled in series with an inductor (not shown), in the exemplary embodiment. Each inductor and an associated output capacitor form an LC filter, and the phase angle δ is a phase angle of the output voltage of a UPS 102 as measured across the output capacitor. Further, a bypass switch 212 is coupled in parallel with each choke 150. Closing bypass switch 212 causes power flow to bypass an associated choke 150.

Loads 120 can receive power from a local UPS 102 (e.g., first load 124 receiving power from first UPS 104) and from other UPSs 102 through choke 150. Accordingly, in the event that a local UPS 102 fails, a load 120 can receive power from other UPSs 102.

In the exemplary embodiment, controller 200, and more specifically processor 202, calculates an output voltage phase angle δ for each UPS 102, and controller operates each UPS 102 at the calculated phase angle δ. Specifically, the output voltage of a given UPS 102 can be represented as $\sqrt{2}*V_{nominal} \sin(\omega t+\delta)$, where $V_{nominal}$ is the voltage of UPS 102, ω is the frequency of AC power delivered by UPS 102 (e.g., 2π*60 Hertz), and t is time.

To share power between UPSs 102 through chokes 150, the phase angle δ for each UPS 102 may be calculated using a variety of load sharing algorithms, as described herein. In the exemplary embodiment, the load sharing algorithms are designed to facilitate equal sharing of power by UPSs 102. Further, using the load sharing algorithms described herein, the phase angle δ for each UPS 102 is calculated using only local load information (e.g., the phase angle δ for first UPS 104 is calculated using load information for first load 124).

Although several exemplary load sharing algorithms are described herein, those of skill in the art will appreciate that load sharing algorithms not specifically described herein are within the spirit and scope of the disclosure. In one example, the phase angle δ is retrieved from a look up table (e.g., on memory device 204) of stored values for a given load sharing algorithm. To reduce the amount of stored values while still providing sufficient granularity, memory device 204 may include a read only memory (ROM) circuit having course values (e.g., every 20 degrees) and subdivisions of fine values (e.g., sub-degrees within each 20 degree range).

Figure 3:
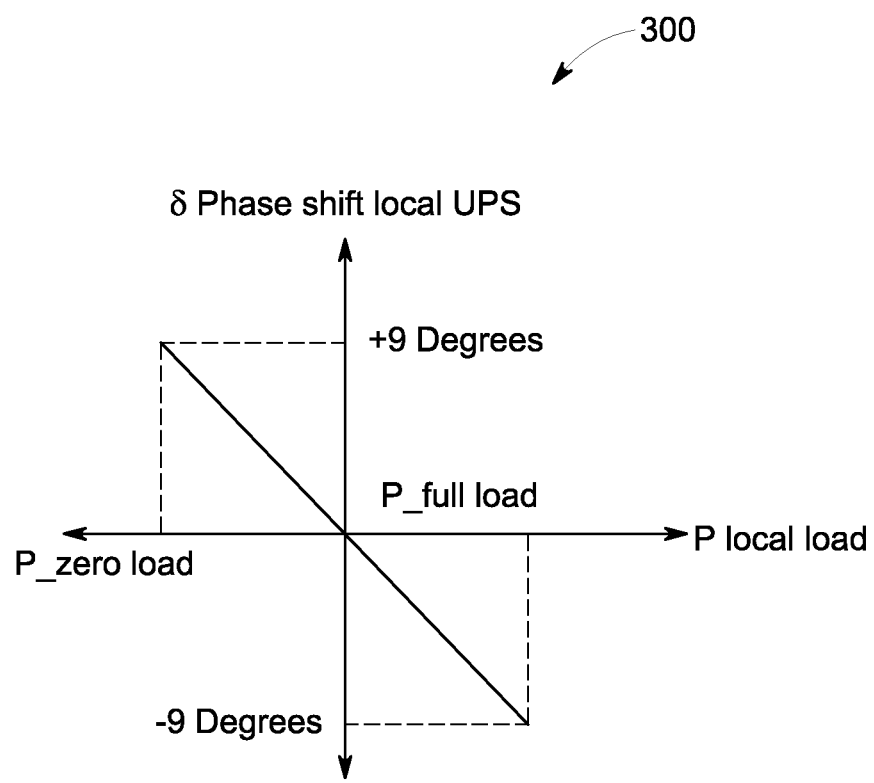
FIG. 3 is a diagram illustrating an exemplary load sharing algorithm that may be used with the system shown in FIGS. 1 and 2.

FIG. 3 is a diagram 300 illustrating one exemplary load sharing algorithm for calculating the phase angle δ. The algorithm may be performed, for example, using controller 200. In the diagram 300 of FIG. 3, for a given UPS 102, the x-axis represents the power to be delivered to the local load 120 associated with UPS 102, and the y-axis is the corresponding phase angle δ for the output voltage of UPS 102. Accordingly, if UPS 102 does not include an associated load 120, it will try to supply a maximum power to ring bus 132, and in doing so, control the phase angle δ to be +9°.

The direction and magnitude of power from a given UPS 102 to ring bus 132 is governed by the following Equation 1:

$$P\_UPS = \frac{V_1 V_2}{x} \sin(\delta) \quad \text{Equation 1}$$

where P_UPS is the power from the given UPS 102 to ring bus 132, $V_1$ is the voltage of the given UPS 102, $V_2$ is the voltage of ring bus 132, δ is the phase angle between $V_1$ and $V_2$, and x is an effective inductive impedance of the choke 150 associated with the given UPS 102. This equation applies to three-phase systems as well.

Accordingly, in the embodiment shown in FIG. 3, the phase angle δ varies linearly with P_Local_Load (i.e., ω, L, and V are substantially constant. Further, in this embodiment, δ is limited to plus or minus 9°. That is, δ for a given UPS 102 can not be set greater than +9° or less than −9° in the exemplary embodiment. This facilitates high resolution and sensitivity of inverter control, while avoiding relatively large phase angle variations when load 120 is bypassed to ring bus 132. Alternatively, δ may be limited to other values (e.g., plus or minus 10°) that enable system 100 to function as described herein. The phase angle δ values obtained using diagram 300 may be stored in a look up table, for example, on memory device 204.

In an alternative exemplary embodiment, the phase angle δ for each UPS 102 is calculated according to the following Equation 2:

$$\delta = A\text{SIN}\left(\left(\frac{P\_Full\_Load}{2} - P\_Local\_Load\right)\frac{\omega*L}{V^2}\right) \quad \text{Equation 2}$$

where ω is the frequency of AC power delivered by UPS 102, L is the inductance of choke 150, P_Local_Load is the power to be delivered to the local load 120 associated with UPS 102, V is the root mean square (RMS) of the AC voltage output by UPS 102, P_Full_Load is the maximum power that can be supplied by UPS 102, and ASIN is the arcsin function. The phase angle δ may be calculated from Equation 2 using, for example, controller 200.

Figure 4:
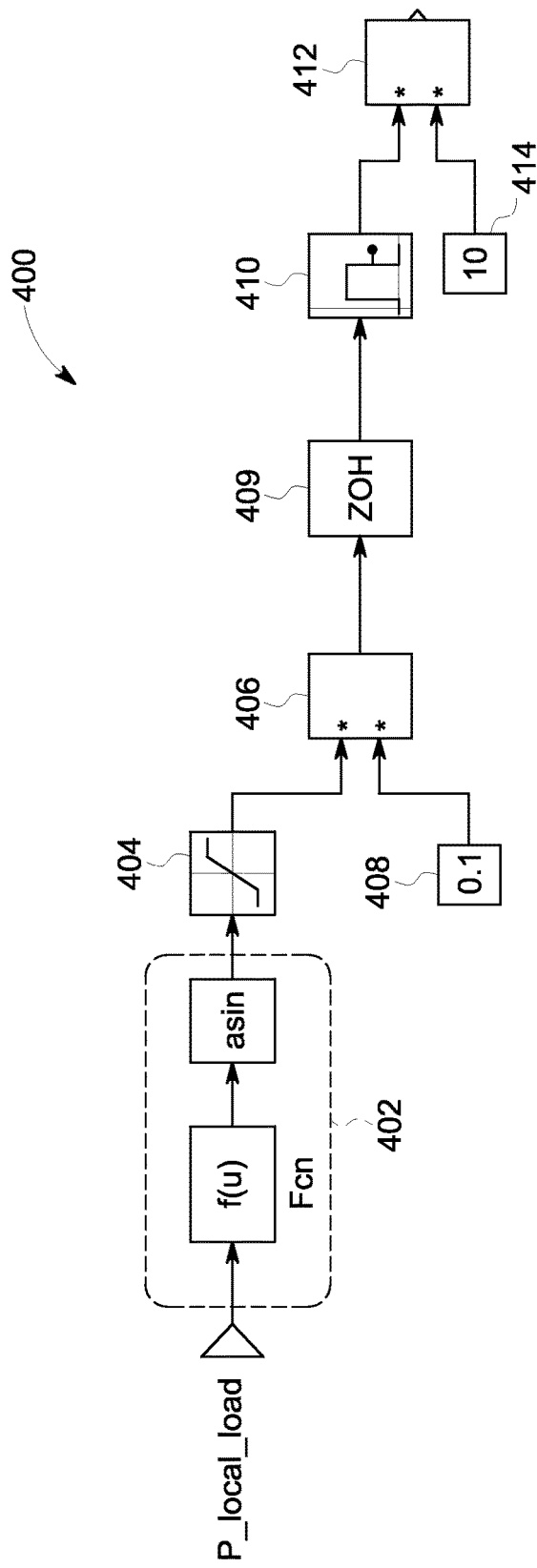
FIG. 4 is a logic diagram of an exemplary load sharing algorithm that may be used with the system shown in FIGS. 1 and 2.

FIG. 4 is a logic diagram of a slow power transfer algorithm 400 that may utilize a look up table based on diagram 300 or Equation 2 to calculate the phase angle δ. Slow power transfer algorithm 400 may be performed, for example, using controller 200. Slow power transfer algorithm 400 facilitates reducing oscillations in system 100. Specifically, if controller 200 merely calculates the phase angles δ and controls UPSs 102 to operate at the calculated phase angles δ substantially instantaneously, UPSs 102 may rapidly change phase angles δ in a relatively short period of time, which may introduce transient oscillations into system 100. Accordingly, slow power transfer algorithm 400 varies the phase angle δ slowly to facilitate a smooth transition to the calculated phase angles δ.

In slow power transfer algorithm 400, P_Local_Load is provided to a phase angle calculation block 402. Using P_Local_Load, phase angle calculation block 402 calculates the phase angle δ (using, e.g., the look up table based on diagram 300 or Equation 2). A limiting block 404 limits the phase angle δ to avoid extreme values. For example, limiting block 404 may limit the phase angle δ to no greater than 9° and no less than −9°.

A first product block 406 multiplies the phase angle δ by a division factor 408. In the exemplary embodiment, division factor 408 is 0.1. Alternatively, division factor 408 may be any value that enables slow power transfer algorithm 400 to function as described herein. A zero-order hold block 409 holds the value from first product block 406 for a predetermined hold time (e.g., 1 millisecond (ms)). A moving average block 410 then calculates a moving average over a predetermined time period (e.g., 10 ms).

A second product block 412 multiplies the value from moving average block 410 by a multiplication factor 414. In the exemplary embodiment, multiplication factor 414 is 10 (i.e., the inverse of division factor 408). Alternatively, multiplication factor 414 may be any value that enables slow power transfer algorithm 400 to function as described herein. The final value generated by second product block 412 is the phase angle δ to which the associated UPS 102 is ultimately set. Accordingly, slow power transfer algorithm 400 gradually transitions UPSs 102 between calculated phase angles δ.

Figure 5:
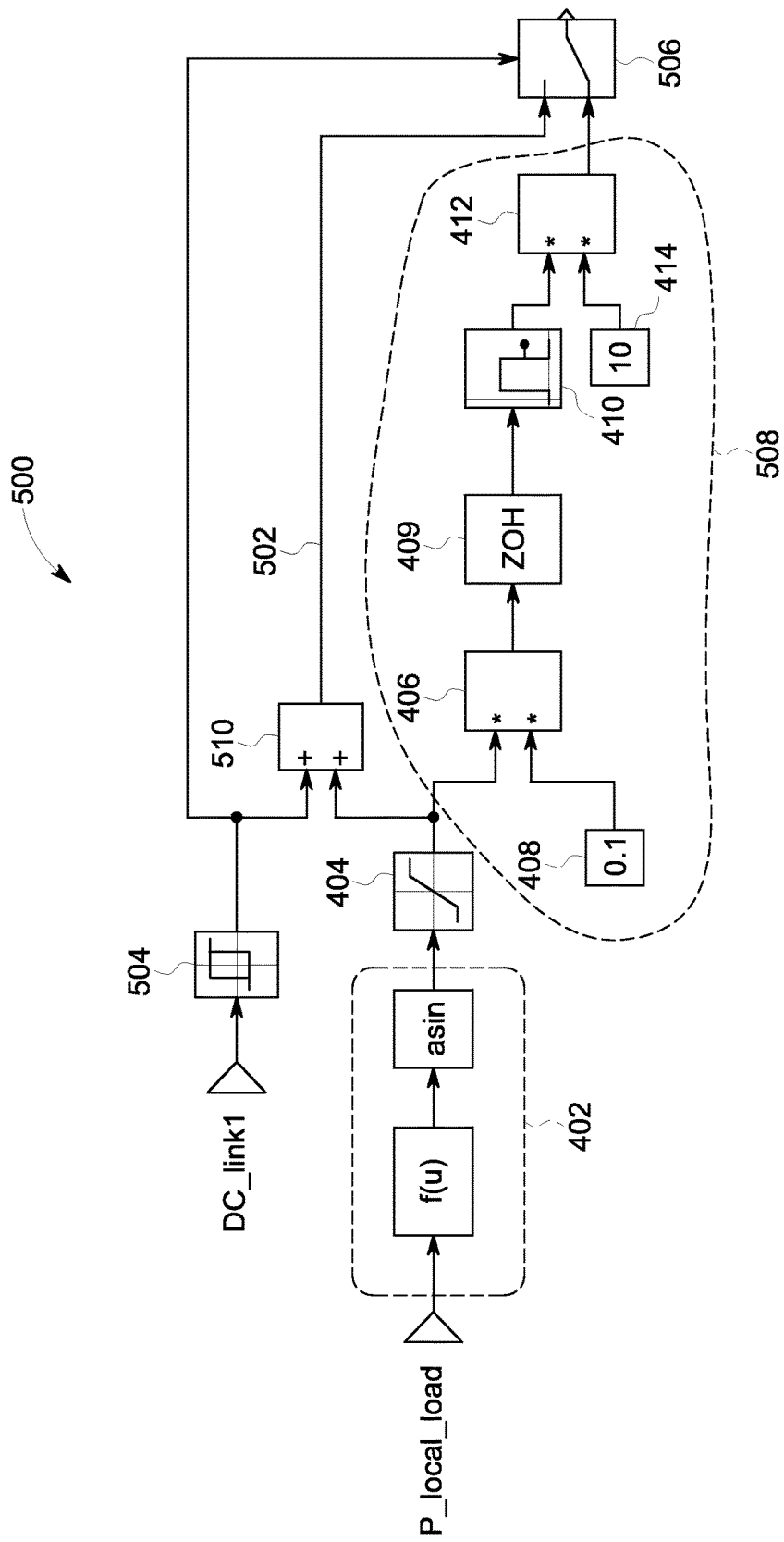
FIG. 5 is a logic diagram of an exemplary load sharing algorithm that may be used with the system shown in FIGS. 1 and 2.

FIG. 5 is a logic diagram of an alternative load sharing algorithm 500 that may utilize a look up table based on diagram 300 or Equation 2 to calculate the phase angle δ. Unless otherwise noted, load sharing algorithm 500 is substantially similar to slow power transfer algorithm 400 (shown in FIG. 4). Load sharing algorithm 500 may be performed, for example, using controller 200 (shown in FIG. 2). Load sharing algorithm 500 accounts for a situation when no load 120 is present for a given UPS 102, and follows a no load logic path 502 when no load 120 is present. For example, a load 120 may suddenly and/or unexpectedly be removed from UPS 102. Accordingly, load sharing algorithm 500 may be referred to as a no load algorithm.

When all or a substantial amount of load 120 is suddenly removed, a DC voltage of a DC input capacitor of an inverter increases. Accordingly, load sharing algorithm 500 provides a value of the DC voltage, DC_Link1, to a software reset-set (SR) flip-flop block 504. If the DC voltage is below a predetermined threshold voltage, flip-flop block 504 is reset at 0°. When flip-flop block 504 outputs 0°, a switch block 506 selects a slow power transfer logic path 508, and the logic proceeds identical to slow transfer power algorithm 400.

If the DC voltage is above the predetermined threshold voltage, flip-flip block 504 is set to 1°. When flip-flop block 504 outputs 1°, switch block 506 selects no load logic path 502, and excludes slow power transfer logic path 508. For no load logic path 502, a summing block 510 sums the 1° output of flip-flop block 504 with the output of limiting block 404. The final value generated by second summing block 510 is the phase angle δ to which the associated UPS 102 is ultimately set.

Figure 6:
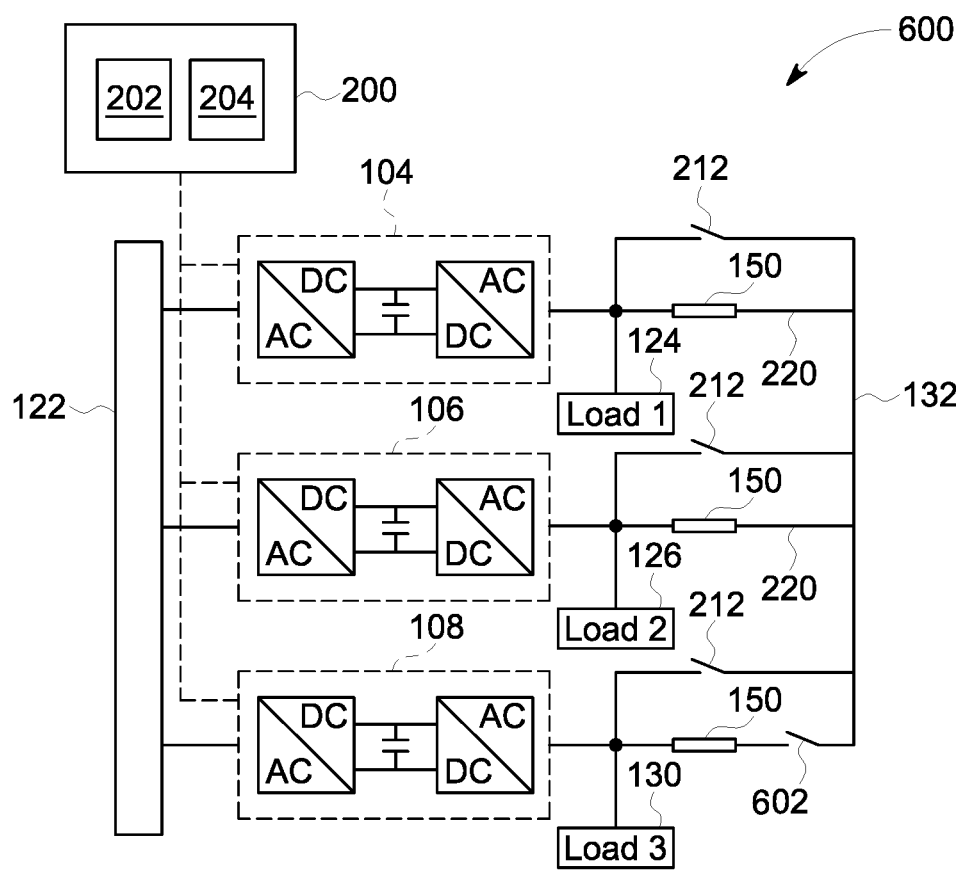
FIG. 6 is a schematic diagram illustrating hot swapping an uninterruptible power supply (UPS) into a power system.

System 100 also facilitates hot swapping one or more UPSs 102 in and/or out of system 100. That is, system 100 facilitates swapping UPSs 102 in and out of system 100 during operation of system 100. FIG. 6 is a schematic diagram of a system 600 that illustrates hot swapping in third UPS 108. That is, system 600 initially includes first UPS 104 and second UPS 106, but not third UPS 108. Unless otherwise noted, system 600 is substantially similar to system 100 (shown in FIGS. 1 and 2).

To swap in third UPS 108, a switch, or contactor, 602 is closed to electrically couple third UPS 108 to ring bus 132. At the moment that switch is closed, it is desirable that no power flows through the choke 150 associated with third UPS 108. To prevent power flow, the voltage on either side of choke 150 associated with third UPS 108 should be the same in phase and in frequency.

Figure 7:
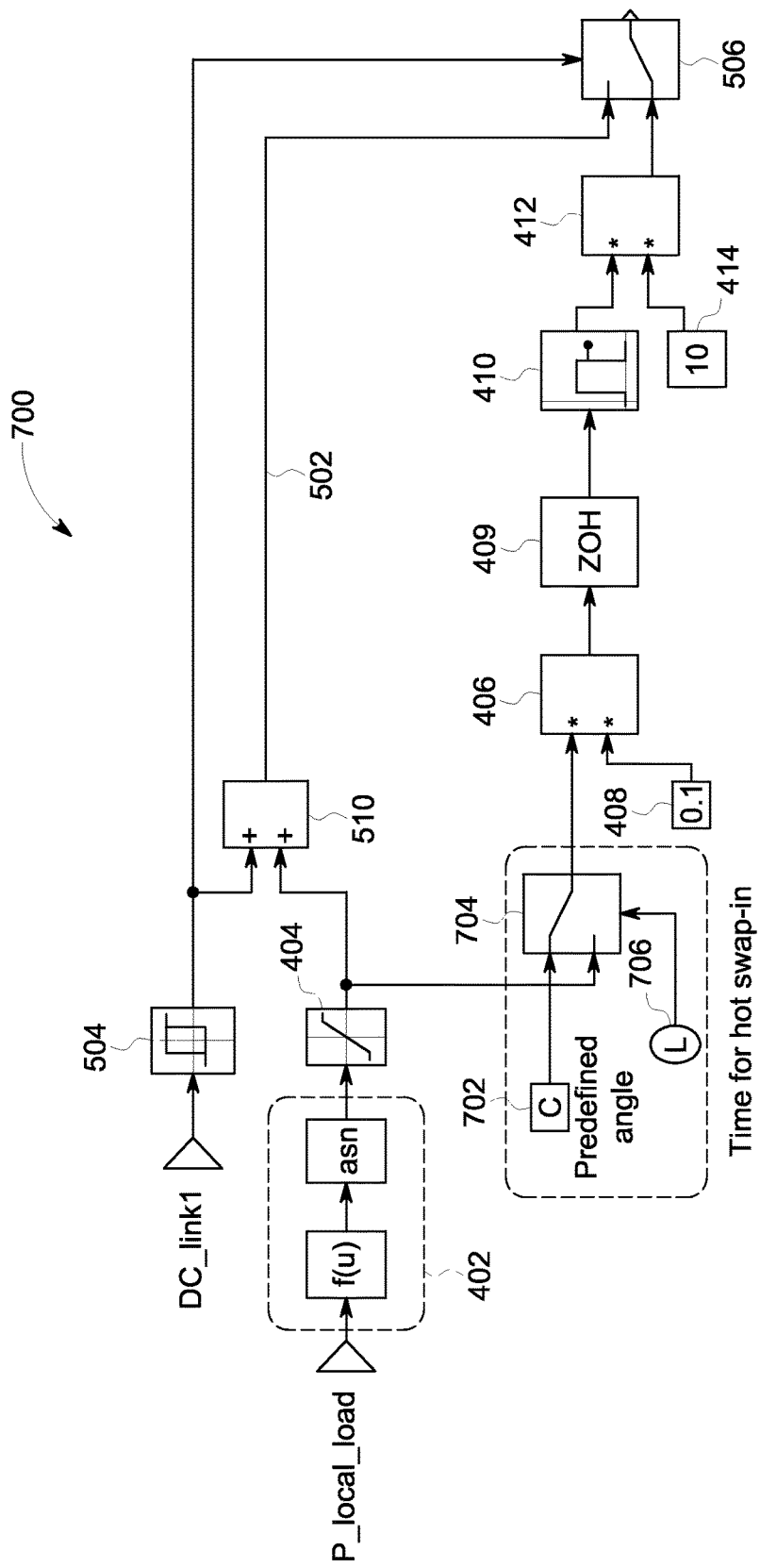
FIG. 7 is a logic diagram of an exemplary load sharing algorithm that may be used when hot swapping a UPS into a power system as shown in FIG. 6.

FIG. 7 is a logic diagram of an alternative load sharing algorithm 700 that may utilize a look up table based on diagram 300 or Equation 2 to calculate the phase angle δ. Unless otherwise noted, load sharing algorithm 700 is substantially similar to load sharing algorithm 500 (shown in FIG. 5). Load sharing algorithm 700 may be performed, for example, using controller 200 (shown in FIG. 2).

Load sharing algorithm 700 facilitates swapping in a UPS, such as third UPS 108. Accordingly, load sharing algorithm 700 may also be referred to as a swapping-in algorithm. Specifically, when a UPS is swapped in, the phase angle δ is not calculated using phase angle calculation block 402. Instead, the phase angle δ is set at a predefined angle for a predetermined period of time. Specifically, when the UPS is swapped in by closing switch 602, a predefined angle block 702 provides a predefined phase angle, c, to a switch block 704, and first product block 406 takes the predefined phase angle c from switch block 704. In the exemplary embodiment, the predefined phase angle c is set equal to a phase angle of the voltage on ring bus 132. Accordingly, when the UPS is swapped in, there is no voltage across associated choke 150, and no power flows through choke 150.

A timer block 706 controls when switch block 704 switches between supplying predefined phase angle c to first product block 406 and supplying the phase angle δ output by limiting block 404 to first product block 406. Specifically, after a predetermined period of time, switch block 704 switches from supplying predefined phase angle c to first product block 406 to supplying the phase angle δ output by limiting block 404 to first product block 406. Accordingly, after the predetermined period of time expires, the phase angle δ for the swapped-in UPS is calculated using phase angle calculation block 402.

Figure 8:
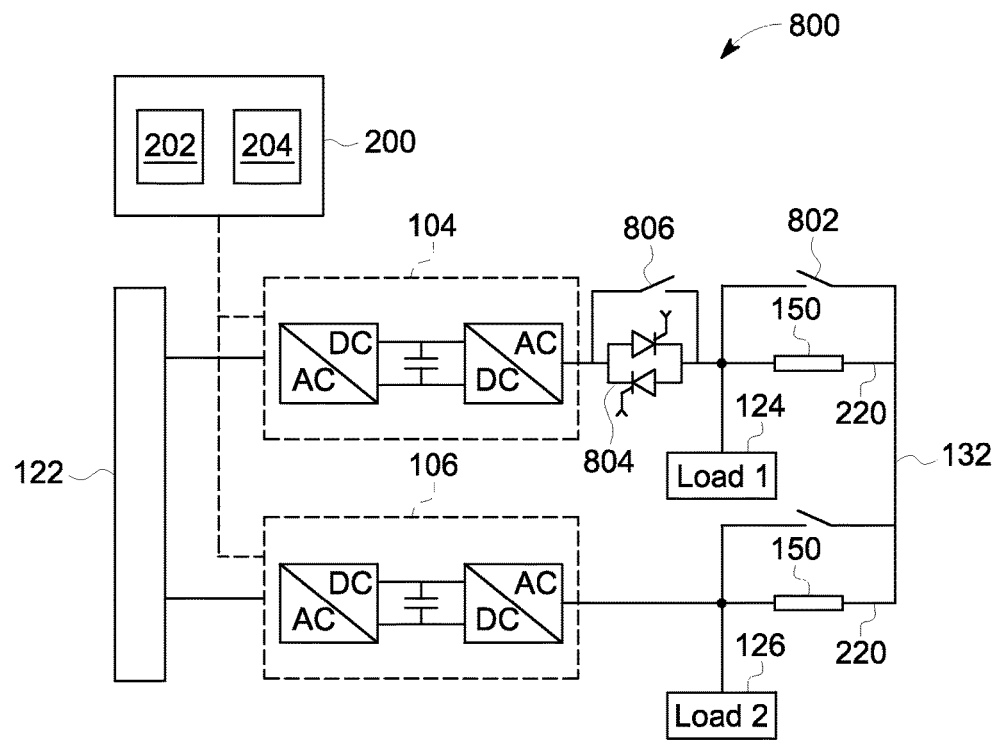
FIG. 8 is a schematic diagram illustrating hot swapping out a UPS from a power system.

FIG. 8 is a schematic diagram of a system 800 that illustrates hot swapping out first UPS 104 in accordance with a swapping-out algorithm. Unless otherwise noted, system 800 is substantially similar to system 100 (shown in FIGS. 1 and 2). System 800 initially includes first UPS 104 and second UPS 106. To facilitate swapping out first UPS 104, system 800 includes a maintenance switch 802 (which is the same as bypass switch 212 (shown in FIG. 2)) electrically coupled in parallel with the choke 150 associated with first UPS 104, a state switch module (SSM) 804 electrically coupled between first UPS 104 and associated choke 150, and a contactor 806 electrically coupled in parallel with SSM 804. In the exemplary embodiment, SSM 804 is a bi-directional thyristor module, capable of flowing current in either direction and capable of switching significantly faster than contactor 806. Alternatively, SSM 804 may be any switching device that enables system 800 to function as described herein.

Before swapping out first UPS 104, maintenance switch 802 is open, SSM 804 is open (i.e., not activated), and contactor 806 is closed. To begin the swapping out procedure, a default load sharing algorithm (such as load sharing algorithm 500 (shown in FIG. 5)) is disabled. With the load sharing algorithm disabled, a phase angle of the voltage on ring bus 132 is measured, and first UPS 104 is made synchronized in phase and frequency with the voltage on ring bus 132. With first UPS 104 operating at the same phase angle and magnitude as the voltage on ring bus 132, no power flows through associated choke 150.

At this point (i.e., without power flowing through associated choke 150), maintenance switch 802 is closed. This connects first load 124 to ring bus 132, bypassing associated choke 150. To remove first UPS 104, the following sequence is performed: (i) SSM 804 is closed (i.e., activated), (ii) contactor 806 is opened, and (iii) SSM 804 is deactivated (i.e., opened). Because SSM 804 is capable of faster switching than contactor 806, utilizing SSM 804 enables disconnecting first UPS 104 from system 800 relatively quickly.

Figure 9:
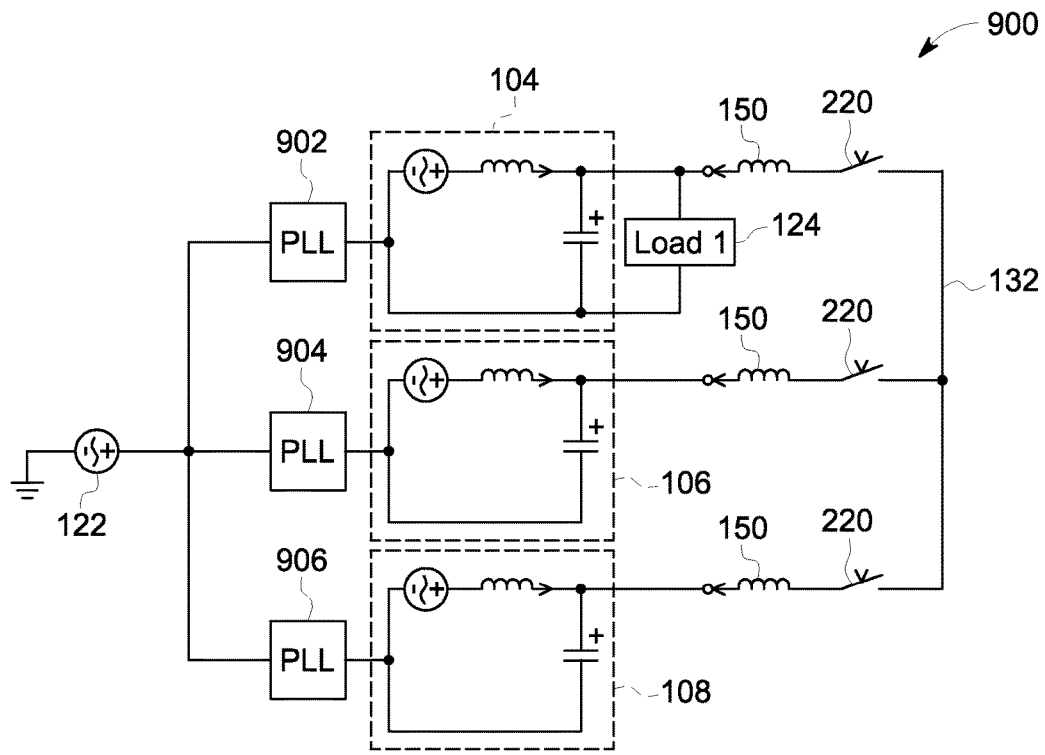
FIG. 9 is a schematic diagram of an exemplary power supply system.

As explained above, the phase angle $\delta$ for each UPS 102 is calculated relative to a common reference angle $\theta$. FIG. 9 is a schematic diagram of a system 900 operating under normal operation. Unless otherwise indicated, system 900 is substantially similar to system 100, with like reference numerals indicating like components.

System 900 includes a first UPS 104, a second UPS 106, and a third UPS 108 each connected to a common utility 122. A first load 124 is coupled between first UPS 104 and ring bus 132. Further, additional loads (not shown in FIG. 9) may be coupled between second and third UPSs 106 and 108 and ring bus 132, such as loads 126 and 130 (shown in FIG. 2).

A first phase locked loop 902, a second phase locked loop 904, and a third phase locked loop 906 provide phase angles $\delta$ to first UPS 104, second UPS 106, and third UPS 108, respectively. First phase locked loop 902, second phase locked loop 904, and third phase locked loop 906 may be implemented, for example, by controller 200 (shown in FIG. 2).

As described above, the phase angles $\delta$ are calculated relative to a common reference angle $\theta$. Under normal operation, as shown in FIG. 9, utility 122 is connected to first UPS 104, second UPS 106, and third UPS 108. Accordingly, under normal operation, in the exemplary embodiment, the common reference angle $\theta$ is the phase angle of the voltage of utility 122.

If utility 122 is lost (i.e., becomes disconnected) for one or more UPSs 102, the disconnected UPSs 102 may be unable use the phase angle of the voltage of utility 122 as the common reference angle $\theta$. However, to facilitate equal load sharing and overall stability of the system, the phase angles $\delta$ should all be calculated relative to the same common reference angle $\theta$. Accordingly, the techniques described herein facilitate determining a common reference angle $\theta$ while utility 122 is disconnected from one or more UPSs 102.

Figure 10:
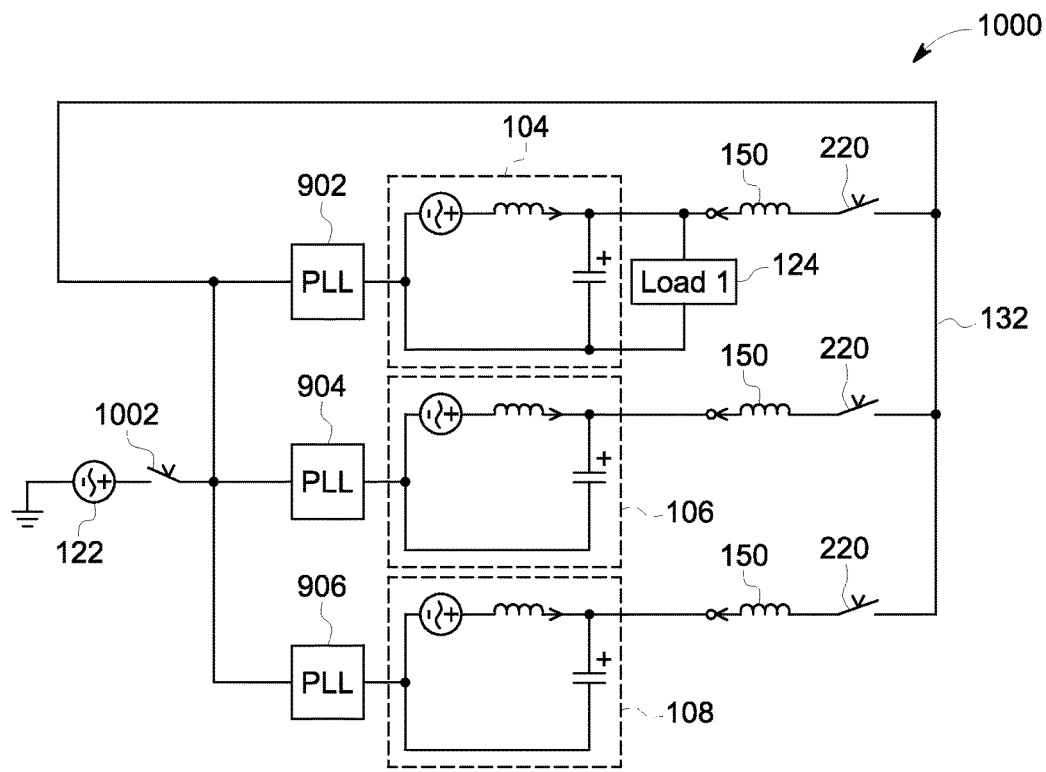
FIG. 10 is a schematic diagram of an exemplary power supply system.

FIG. 10 is a schematic diagram of a system 1000 that illustrates determining a common reference angle $\theta$ when utility 122 is disconnected from every UPS 102. Unless otherwise indicated, system 1000 is substantially similar to system 900, with like reference numerals indicating like components.

As shown in FIG. 10, utility 122 is disconnected from first UPS 104, second UPS 106, and third UPS 108 (indicated by an open switch 1002). In the exemplary embodiment, in this scenario, a voltage phase angle of ring bus 132 is used as the common reference angle $\theta$. That is, phase locked loops 902, 904, and 906 calculate their respective phase angles $\delta$ relative to the voltage phase angle of ring bus 132, facilitating equal load sharing and overall stability of system 1000.

Figure 11:
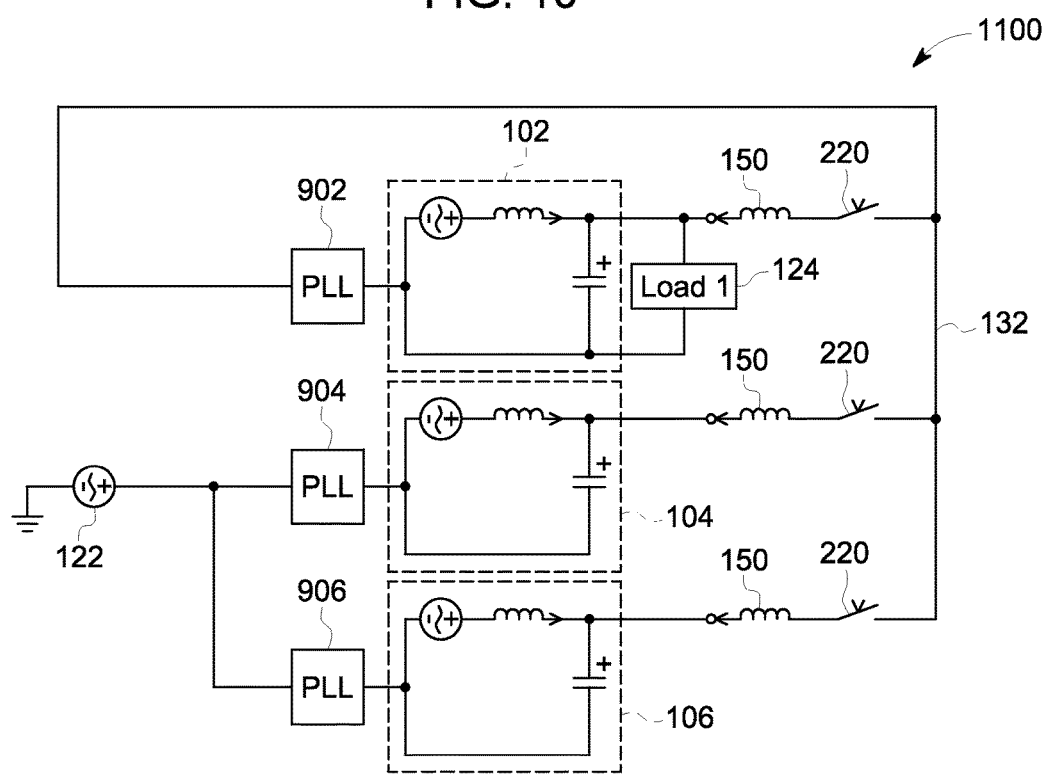
FIG. 11 is a schematic diagram of an exemplary power supply system.

FIG. 11 is a schematic diagram of a system 1100 that illustrates determining a common reference angle $\theta$ when utility 122 is disconnected from only some UPSs 102. Unless otherwise indicated, system 1100 is substantially similar to system 900, with like reference numerals indicating like components.

As shown in FIG. 11, utility 122 is disconnected from first UPS 104, but remains connected to second UPS 106 and third UPS 108. However, if first UPS 104 uses the voltage phase angle of ring bus 132 as the common reference angle $\theta$, and second and third UPSs 106 and 108 use the voltage phase angle of utility 122 as the common reference angle $\theta$, instabilities and/or a malfunction in load sharing may occur, as UPSs 102 are not all using the same common reference angle $\theta$.

Accordingly, in the exemplary embodiment, in this scenario, during a start-up period of system 1100, all UPSs 102 produce a nominal voltage at the same angle and in phase with utility 122. Once a voltage on ring bus 132 is relatively stable, even though second and third UPSs 106 and 108 are connected to utility 122, first phase locked loop 902, second phase locked loop 904, and third phase locked loop 906 all use the voltage phase angle of ring bus 132 as the common reference angle $\theta$.

As such, each UPS 102 produces an output voltage at the same phase angle $\delta$ relative to the voltage phase angle of ring bus 132. Once all UPSs 102 are synchronized at the same output voltage phase angle, the phase angle $\delta$ of each UPS 102 may be varied (e.g., using the load sharing algorithms described above) to facilitate load sharing in system 1100. Further, to keep the frequency of the output voltage of each UPS 102 similar to the input voltage frequency from utility 122, an incremental delta correction in the output voltage frequency is performed.

Figure 12:
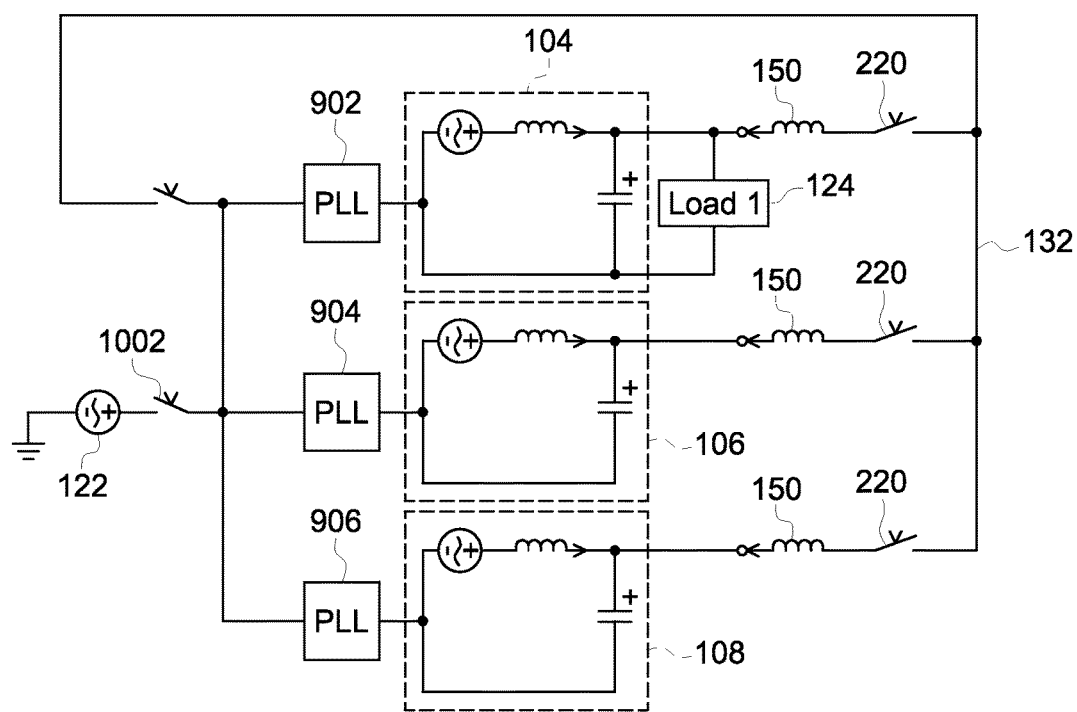
FIG. 12 is a schematic diagram of an exemplary power supply system.

Notably, UPSs 102 can only use the voltage phase angle of ring bus 132 as the common reference angle $\theta$ when at least two UPSs 102 are connected to ring bus 132. FIG. 12 is a schematic diagram of a system 1200 that illustrates determining a common reference angle $\theta$ when first connecting UPSs 102 to ring bus 132. Unless otherwise indicated, system 1100 is substantially similar to system 900, with like reference numerals indicating like components. As shown in FIG. 12, initially, none of first UPS 104, second UPS 106, and third UPS 108 are connected to ring bus 132. For the purposes of illustration, suppose first UPS 104 is about to be connected to ring bus 132 by closing switch 220 between first UPS 104 and ring bus 132.

Figure 13:
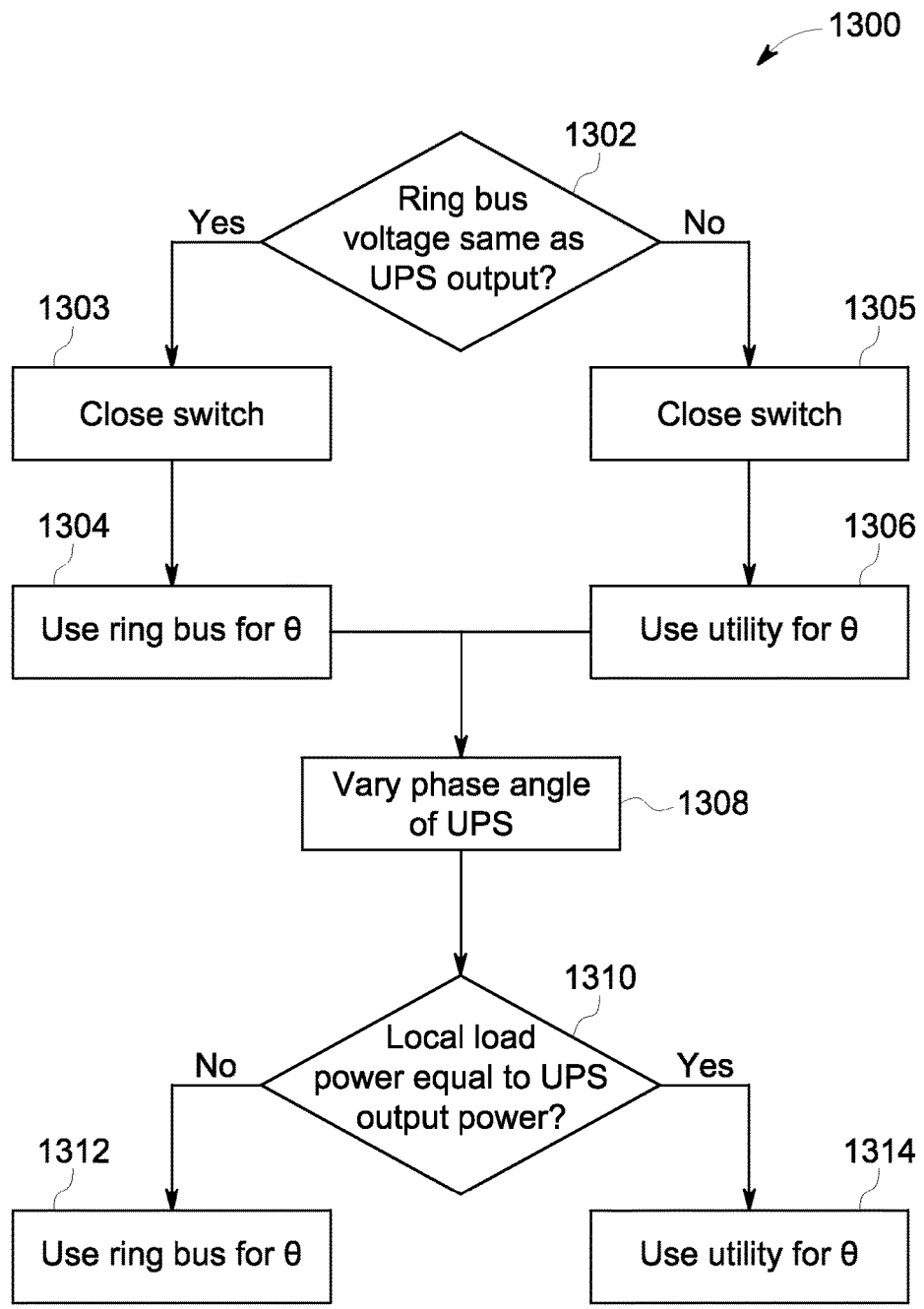
FIG. 13 is a flow diagram of an exemplary method for determining a common reference angle.

To determine whether to use the voltage phase angle of ring bus 132 or the voltage phase angle of utility 122 as the common reference angle $\theta$ for a given UPS 102 (e.g., first UPS 104), in the exemplary embodiment, the method 1300 shown in FIG. 13 is performed. Method 1300 may be performed, for example, using controller 200 (shown in FIG. 2).

Initially, with switch 220 between UPS 102 and ring bus 132 open, the voltage on ring bus 132 is measured (e.g., using a voltage sensor (not shown)), and it is determined 1302 whether the ring bus voltage is approximately equal to (e.g., within plus or minus 5% of) a nominal root mean square (RMS) output voltage of UPS 102. If the ring bus voltage is approximately equal to the UPS output voltage, switch 220 is closed 1303 and the voltage phase angle of ring bus 132 is set 1304 as the common reference angle θ. If the ring bus voltage is not approximately equal to the UPS output voltage (e.g., if the ring bus voltage is substantially zero), switch 220 is closed 1305 and the voltage phase angle of utility 122 is set 1306 as the common reference angle θ.

Once switch 220 is closed, the phase angle δ is varied 1308 by a relatively small amount. For example, the phase angle δ may be varied by an amount from 0.1 to 0.5 degrees. After varying 1308 the phase angle δ, it is determined 1310 whether the power received by the local load 120 is equal to the output power of UPS 102. If the load power is not equal to the UPS output power, then it is very likely that another UPS 102 is connected to ring bus 132. Accordingly, under this condition, the voltage phase angle of ring bus 132 is set 1312 as the common reference angle θ. However, if the load power is equal to the UPS output power, the voltage phase angle of utility 122 is set 1314 as the common reference angle θ. This subroutine (e.g., steps 1308-1314) may be performed periodically until at least one additional UPS 102 is connected to ring bus 132. Notably, the hot swapping techniques discussed above are applicable when adding UPSs to 102 system 1200.

As compared to at least some known power systems, the systems and methods described herein facilitate synchronizing a plurality of UPSs such that the plurality of UPSs do not interfere with or override one another. Using a load sharing algorithm, a control device calculates a phase angle for each UPS. The phase angle is calculated relative to a common reference angle, and the systems and methods described herein facilitate determining the common reference angle under different circumstances (e.g., when at least one UPS becomes disconnected from a utility).

Exemplary embodiments of systems and methods for uninterruptible power supplies are described above in detail. The systems and methods are not limited to the specific embodiments described herein but, rather, components of the systems and/or operations of the methods may be utilized independently and separately from other components and/or operations described herein. Further, the described components and/or operations may also be defined in, or used in combination with, other systems, methods, and/or devices, and are not limited to practice with only the systems described herein.

At least one technical effect of the systems and methods described herein includes (a) determining a common reference angle while a utility is disconnected from at least one UPS of a plurality of UPSs; (b) calculating a phase angle for each UPS of the plurality of UPSs, wherein the phase angle for each UPS is calculated relative to the common reference angle; and (c) controlling operation of each UPS based on the respective calculated phase angles.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:
    a utility;
    a plurality of uninterruptible power supplies (UPSs);
    a ring bus;
    at least one load electrically coupled to said plurality of UPSs and said ring bus; and
    a controller communicatively coupled to said plurality of UPSs, said controller configured to:
        determine a common reference angle based on a voltage of said ring bus while said utility is disconnected from at least one UPS of said plurality of UPSs;
        calculate a phase angle for each UPS of said plurality of UPSs, wherein the phase angle for each UPS is calculated relative to the common reference angle; and
        control operation of each UPS based on the respective calculated phase angles.

2. A system in accordance with claim 1, wherein to determine a common reference angle, said controller is configured to determine the common reference angle when said utility becomes disconnected from all of said plurality of UPSs.

3. A system in accordance with claim 1, wherein to determine a common reference angle, said controller is configured to determine the common reference angle when said utility becomes disconnected from less than all of said plurality of UPSs.

4. A system in accordance with claim 1, wherein to determine a common reference angle, said controller is configured to determine the common reference angle as a phase angle of the voltage on said ring bus.

5. A system in accordance with claim 1, wherein to determine a common reference angle, said controller is configured to determine the common reference angle based on whether the voltage on said ring bus is approximately equal to an output voltage of one UPS of said plurality of UPSs.

6. A system in accordance with claim 5, wherein said controller is configured to:
    determine the common reference angle as a phase angle of the voltage on said ring bus when the voltage on said ring bus is approximately equal to the output voltage of said one UPS; and
    determine the common reference angle as a phase angle of an output voltage of said utility when the voltage on said ring bus is not approximately equal to the output voltage of said one UPS.

7. A system in accordance with claim 1, wherein to determine a common reference angle, said controller is configured to:

vary an initial phase angle for one UPS of said plurality of UPSs; and determine the common reference angle based on whether an output power of said one UPS is equal to a received power of an associated load that is coupled to said one UPS.

8. A system in accordance with claim 7, wherein said controller is configured to:

determine the common reference angle as a phase angle of the voltage on said ring bus when the output power is unequal to the received power; and determine the common reference angle as a phase angle of an output voltage of said utility when the output power is equal to the received power.

9. A controller for controlling a power supply system that includes a utility, a plurality of uninterruptible power supplies (UPSs), a ring bus, and at least one load electrically coupled to the plurality of UPSs and the ring bus, said controller comprising:

a processor; and a memory device communicatively coupled to said processor, said memory device storing executable instructions configured to cause said processor to:

determine a common reference angle based on a voltage of the ring bus while the utility is disconnected from at least one UPS of the plurality of UPSs;

calculate a phase angle for each UPS of the plurality of UPSs, wherein the phase angle for each UPS is calculated relative to the common reference angle; and control operation of each UPS based on the respective calculated phase angles.

10. A controller in accordance with claim 9, wherein to determine a common reference angle, said executable instructions are configured to cause said processor to determine the common reference angle when the utility becomes disconnected from all of the plurality of UPSs.

11. A controller in accordance with claim 9, wherein to determine a common reference angle, said executable instructions are configured to cause said processor to determine the common reference angle when the utility becomes disconnected from less than all of the plurality of UPSs.

12. A controller in accordance with claim 9, wherein to determine a common reference angle, said executable instructions are configured to cause said processor to determine the common reference angle as a phase angle of the voltage on the ring bus.

13. A controller in accordance with claim 9, wherein to determine a common reference angle, said controller is configured to determine the common reference angle based on whether the voltage on the ring bus is approximately equal to an output voltage of one UPS of the plurality of UPSs.

14. A controller in accordance with claim 13, wherein said controller is configured to:

determine the common reference angle as a phase angle of the voltage on the ring bus when the voltage on the ring bus is approximately equal to the output voltage of the one UPS; and determine the common reference angle as a phase angle of an output voltage of the utility when the voltage on the ring bus is not equal to the output voltage of the one UPS.

15. A controller in accordance with claim 9, wherein to determine a common reference angle, said controller is configured to:

vary an initial phase angle for one UPS of the plurality of UPSs; and determine the common reference angle based on whether an output power of the one UPS is equal to a received power of an associated load that is coupled to the one UPS.

16. A controller in accordance with claim 15, wherein said controller is configured to:

determine the common reference angle as a phase angle of the voltage on the ring bus when the output power is unequal to the received power; and determine the common reference angle as a phase angle of an output voltage of the utility when the output power is equal to the received power.

17. A method of controlling a power supply system that includes a utility, a plurality of uninterruptible power supplies (UPSs), a ring bus, and at least one load electrically coupled to the plurality of UPSs and the ring bus, the method comprising:

determining a common reference angle based on a voltage of the ring bus while the utility is disconnected from at least one UPS of the plurality of UPSs;

calculating, using a controller communicatively coupled to the plurality of UPSs, a phase angle for each UPS of the plurality of UPSs, wherein the phase angle for each UPS is calculated relative to the common reference angle; and controlling operation of each UPS based on the respective calculated phase angles.

18. A method in accordance with claim 17, wherein determining a common reference angle comprises determining the common reference angle when the utility becomes disconnected from all of the plurality of UPSs.

19. A method in accordance with claim 17, wherein determining a common reference angle comprises determining the common reference angle when the utility becomes disconnected from less than all of the plurality of UPSs.

20. A method in accordance with claim 17, wherein determining a common reference angle comprises determining the common reference angle as a phase angle of the voltage on the ring bus.

* * * * *